April 11, 1967 — D. I. BOHN — 3,313,992
BRAKING CIRCUIT
Filed Oct. 30, 1963
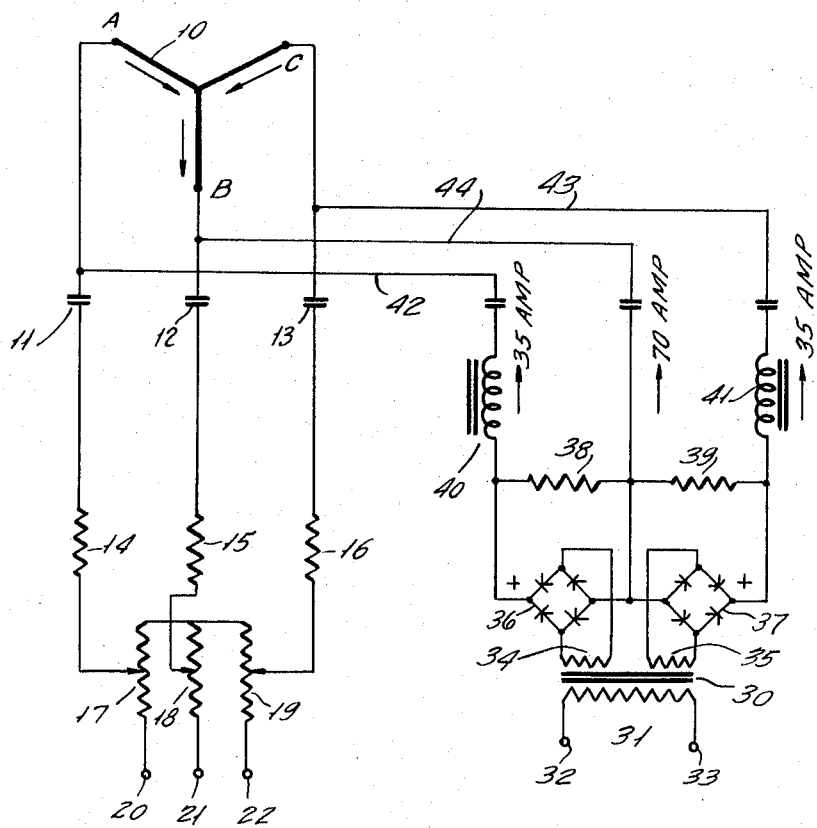
INVENTOR.
DONALD I. BOHN
BY
OSTROLENK, FABER, GERB & SOFFEN
ATTORNEYS

3,313,992
BRAKING CIRCUIT
Donald I. Bohn, Asheville, N.C., assignor to I-T-E Circuit Breaker Company, Philadelphia, Pa., a corporation of Pennsylvania
Filed Oct. 30, 1963, Ser. No. 320,163
3 Claims. (Cl. 318—212)

This invention relates to a novel braking circuit for wound rotor A.-C. motors, and is more specifically an improvement of my copending application Ser. No. 257,682 filed Feb. 11, 1963 entitled Stepless Rotor Resistance Control Circuit Using an Open Delta Connection and assigned to the assignee of the present invention, now abandoned.

My above noted copending application describes the novel method for injecting D.-C. current into the stator winding of an A.-C. motor during braking conditions. In that application, however, D.-C. is applied only to two of the three stator terminals. The present invention is directed to an improvement in the D.C. injecting circuit of my above noted application wherein D.C. may be injected into all three of the stator terminals.

Accordingly, a primary object of this invention is to provide a novel braking circuit for A.-C. motors.

Another object of this invention is to inject D.-C. current into all three phases of an A.-C. stator while A.-C. voltage is simultaneously applied to the stator.

Another object of this invention is to provide smoother braking operation for A.-C. motors during heavy load, low speed braking conditions.

These and other objects of the invention will become apparent when taken in connection with the description of the drawing which schematically illustrates a novel modification which forms the present invention.

Referring now to the drawing, I have schematically illustrated therein a three-phase stator 10 having terminals A, B and C which are connected through contactors 11, 12 and 13 respectively, and current limiting resistors 14, 15 and 16 respectively to autotransformer windings 17, 18 and 19 respectively. The autotransformer is then connected to three-phase A.-C. terminals 20, 21 and 22.

A full description of the manner in which the rotor (not shown) of the motor having stator windings 10 may be braked under load is given in my above noted copending application which is herein incorporated into the present application.

As described in the above noted application, this braking is accomplished by the simultaneous application of A.-C. power to the stator which drives the rotor to lower a load and the injection of D.-C. current in the stator circuit which opposes this lowering torque.

In my above noted application, however, D.-C. current was injected only in two of the stator terminals. In accordance with the present invention, I have provided a novel circuit for injecting D.-C. current into the three stator terminals, A, B and C along with the simultaneous application of A.-C. power to the terminals A, B and C from A.-C. terminals 20, 21 and 22.

More specifically, the drawing illustrates the novel circuit of the present invention including a transformer 30 which has a primary winding 31 connected to a suitable source of A.-C. voltage at terminals 32 and 33, and two secondary windings 34 and 35. Each of windings 34 and 35 are then connected to single phase full wave rectifier bridges 36 and 37 respectively which have the polarities indicated on the drawing. Rectifiers 36 and 37 then have resistors 38 and 39 respectively connected thereacross.

Two saturable-type reactors 40 and 41 respectively are then connected in conductors 42 and 43 extending from terminals A and C respectively, while a third conductor 44 extends from terminal B to the junction of resistors 38 and 39.

Considering first the right-hand portion of the circuit which includes rectifier 37 and reactor 41, it will be seen that this half of the circuit is identical to that of my above noted copending application, and, by itself, could inject D.-C. current into terminals B and C under braking conditions.

In accordance with the invention, however, the addition of the other half of the circuit including rectifier 36 and reactor 40 permits the additional injection of D.-C. current into terminals A and B. Thus, D.-C. current will be injected into all of the terminals A, B and C of stator 10, as indicated by the arrows on the windings of stator 10.

It will be noted that the operation of each half of the circuit of FIGURE 10 is identical to that described in my above noted copending application and need not be given in more detail herein.

It will, however, be noted that the pulsating currents through each of reactors 40 and 41 are 60° out of phase. Thus, when these currents are combined in phase B of stator 10, the D.-C. current will flow for a greater portion of the cycle than in phases A and C. This change of waveform in phase B along with the out-of-phase relation between the pulsating currents in phases A and C will provide a smoother operation with less "motor growl" under heavy, low speed braking than is the case with the single circuit scheme of my above noted application. Thus, the invention, while apparently duplicating two of the circuits of my above noted application, in fact provides the new and unexpected results of improved operation in view of the phase displacements of the various currents applied to the various windings.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A braking circuit for a three-phase A.-C. induction motor having a three-phase stator winding, each of said phases of said stator winding having a respective terminal; said braking circuit including a first and second D.-C. current injection circuit; the terminals of said first D.-C. current injection circuit respectively connected to a first and a second of said stator winding terminals; the terminals of said second D.-C. current injection circuit respectively connected to said second terminal and a third of said stator winding terminals each of said D.-C. current injection circuits including a respective D.-C. voltage source, and a respective saturable reactor connected in series with said D.-C. voltage source and the said terminals of said respective D.-C. current injection circuit; each of said respective D.-C. voltage sources including a rectifier means, and a common single phase voltage source connected to each of said rectifier means; said first and second D.-C. current injection circuits conducting unidirectional current pulses 60° phase displaced from one another.

2. The braking circuit of claim 1 wherein said terminals of said first and second D.-C. injection circuit connected to said second stator winding terminal have the same polarity.

3. The braking circuit substantially as set forth in claim 1 wherein the negative terminals of each of said D.-C. sources is connected to a common conductor extending to said second terminal of said stator winding.

References Cited by the Examiner

UNITED STATES PATENTS

| 2,637,007 | 4/1953 | Picking et al. | 318—212 |
| 3,166,701 | 1/1965 | Bohn | 318—212 |

FOREIGN PATENTS

| 1,109,498 | 7/1954 | France. |

ORIS L. RADER, *Primary Examiner.*

G. Z. RUBINSON, *Assistant Examiner.*